US011242682B2

(12) United States Patent
Van Kirk et al.

(10) Patent No.: US 11,242,682 B2
(45) Date of Patent: Feb. 8, 2022

(54) MODULAR PANEL ASSEMBLY FOR AN ENCLOSURE

(71) Applicant: Bath Authority LLC, Warminster, PA (US)

(72) Inventors: Patrick Van Kirk, Philadelphia, PA (US); Samuel Reed, Langhorne, PA (US); Leo Volkov, Wynnewood, PA (US); Michael Minkovich, Richboro, PA (US); Michael Korsky, Newtown, PA (US); Marina Seredova, Warminster, PA (US); Brian Lieb, Philadelphia, PA (US)

(73) Assignee: BATH AUTHORITY LLC, Warminster, PA (US)

( * ) Notice: Subject to any disclaimer, the term of this patent is extended or adjusted under 35 U.S.C. 154(b) by 0 days.

(21) Appl. No.: 16/665,196

(22) Filed: Oct. 28, 2019

(65) Prior Publication Data

US 2021/0123234 A1    Apr. 29, 2021

(51) Int. Cl.
| | | |
|---|---|---|
| *E04B 2/74* | (2006.01) | |
| *E04B 1/41* | (2006.01) | |
| *E04B 1/38* | (2006.01) | |
| *G06F 3/147* | (2006.01) | |
| *A47K 3/30* | (2006.01) | |

(52) U.S. Cl.
CPC .............. *E04B 2/7407* (2013.01); *E04B 1/40* (2013.01); *A47K 3/30* (2013.01); *E04B 2001/405* (2013.01); *E04B 2002/7461* (2013.01); *G06F 3/147* (2013.01)

(58) Field of Classification Search
CPC .... E04B 2/7407; E04B 1/40; E04B 2001/405; E04B 2002/7461; E04B 2/7433; E04B 2002/7483; E04B 2/78; G06F 3/147; A47K 3/30
See application file for complete search history.

(56) References Cited

U.S. PATENT DOCUMENTS

| | | | |
|---|---|---|---|
| 2,094,294 A | 9/1937 | Garritsen | |
| D182,509 S | 4/1958 | Etling | |
| 4,099,888 A * | 7/1978 | Simone | F16B 7/18 403/172 |
| 4,512,097 A * | 4/1985 | Zeigler | G09F 15/0068 40/610 |
| 5,946,874 A * | 9/1999 | Roberts | G09F 7/18 52/464 |
| 6,378,265 B1 * | 4/2002 | Konstandt | E04B 1/1903 403/171 |
| 6,758,354 B2 * | 7/2004 | Carletti | G09F 15/0068 211/182 |

(Continued)

*Primary Examiner* — Phi D A
(74) *Attorney, Agent, or Firm* — Fox Rothschild LLP (57) ABSTRACT

A modular panel assembly for use with, e.g., a shower enclosure. The modular panel assembly includes a plurality of panels, each panel having a first side surface and a second side surface. The modular panel assembly also include a plurality of channel members, wherein each channel member is configured to be coupled to an edge portion of one or more panels. Additionally, a plurality of brackets are provided, wherein each bracket is configured to hold both the first side surface and the second side surface of two or more of the plurality of panels and an end portion of one or more of the plurality of channel members.

21 Claims, 11 Drawing Sheets

(56) References Cited

U.S. PATENT DOCUMENTS

| | | | |
|---|---|---|---|
| 7,096,637 B2* | 8/2006 | McMillan | G09F 15/0068 |
| | | | 52/653.1 |
| 7,143,550 B1* | 12/2006 | Lopez | E04B 1/19 |
| | | | 52/81.3 |
| 7,481,235 B2* | 1/2009 | Prusmack | E04H 15/18 |
| | | | 135/120.3 |
| D816,814 S | 5/2018 | Shtraks et al. | |
| D816,815 S | 5/2018 | Lieb et al. | |
| D816,818 S | 5/2018 | Lieb et al. | |
| D892,996 S | 8/2020 | Molina et al. | |
| D895,843 S | 9/2020 | Cobb | |
| 2014/0047791 A1* | 2/2014 | Carnes | E04C 3/28 |
| | | | 52/653.2 |
| 2019/0294207 A1* | 9/2019 | Durant | G06F 3/147 |

\* cited by examiner

MODULAR PANEL ASSEMBLY FOR AN ENCLOSURE

BACKGROUND

The present disclosure relates to modular panel assemblies. More particularly, the disclosure relates to an assembly utilizing a plurality of brackets and channel members to support a plurality of separate panels, forming a panel assembly for use with, e.g., a shower enclosure.

In the past, many commonly used enclosures for tub/shower facilities included a pair of sliding glass doors framed in metal. In a typical installation, an outer metal frame circumscribed the entry to the bath and was attached at the sides to the walls of the facility. The installation also included a header spanning the entrance and a guide rail attached to the tub or shower base. The shower doors were hung at the top from the header and guided at the bottom by the rail so that they can slide back and forth in the entryway to allow entry and egress and to create a splash barrier. However, these type of enclosures were often restrictive to user entry/exit, difficult to clean and maintain, and aesthetically unappealing.

More recently, enclosure systems which eliminate the need for a shower door header have become increasingly popular. These systems often include an all-glass shower door hingedly or slidably connected to a neighboring glass panel, which is in turn mounted to an adjacent wall. As the glass shower door and glass panel do not need to be framed entirely in metal, the enclosure is not restrictive to entry/exit, is easier to maintain, and is more aesthetically appealing.

However, even with the advantages of an all-glass (or primarily-glass) enclosure, there are some detrimental aspects. One drawback is the fact that a single large pane of glass must be used to form each of the shower door and neighboring panel. Using a single pane of glass makes customization of the door size, shape, color, pattern, etc., more difficult and/or more expensive.

This patent document described assemblies and/or configurations that are intended to address the issues discussed above and/or other issues.

SUMMARY OF THE INVENTION

In accordance with an aspect of the disclosure, a modular panel assembly is disclosed. The modular panel assembly may include a plurality of panels, each panel having a first side surface and a second side surface, wherein the second side surface is opposite the first side surface. The modular panel assembly may further include a plurality of channel members, wherein each channel member is configured to be coupled to an edge portion of one or more panels. Additionally, the modular panel assembly may include a plurality of brackets, wherein each bracket is configured to hold both the first side surface and the second side surface of two or more of the plurality of panels and an end portion of one or more of the plurality of channel members.

According to another aspect of the disclosure, a modular panel assembly for an enclosure is disclosed. The modular panel assembly may include a plurality of panels and a plurality of channel members. Additionally, the modular panel assembly may include a plurality of brackets, wherein each bracket is configured to couple two or more of the panels. The modular panel assembly may further include at least one of a digital display, a digital touch interface, a digital writing interface, a voice recording device, or a panel configured to display a projected image.

In accordance with another aspect of the disclosure, a method of forming a modular panel assembly is disclosed. The method may include providing a plurality of panels, wherein each panel has a first side surface and a second side surface. The method may also include providing a plurality of channel members having at least one channel formed therein. Additionally, the method may include coupling a channel member to at least one edge portion of each of the panels. The method may also include arranging the plurality of panels into a desired pattern of adjacent panels, and providing a plurality of brackets. Furthermore, the method may include clamping a bracket to the first side surface and the second side surface of two or more adjacent panels and to an end portion of one or more channel members.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION OF THE INVENTION

The following description is made for the purpose of illustrating the general principles of the present system and is not meant to limit the inventive concepts claimed in this document. Further, particular features described in this document can be used in combination with other described features in each of the various possible combinations and permutations.

Unless otherwise specifically defined in this document, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to". Additionally, use the term "couple", "coupled", or "coupled to" may imply that two or more elements may be directly connected or may be indirectly coupled through one or more intervening elements.

Figure 1:
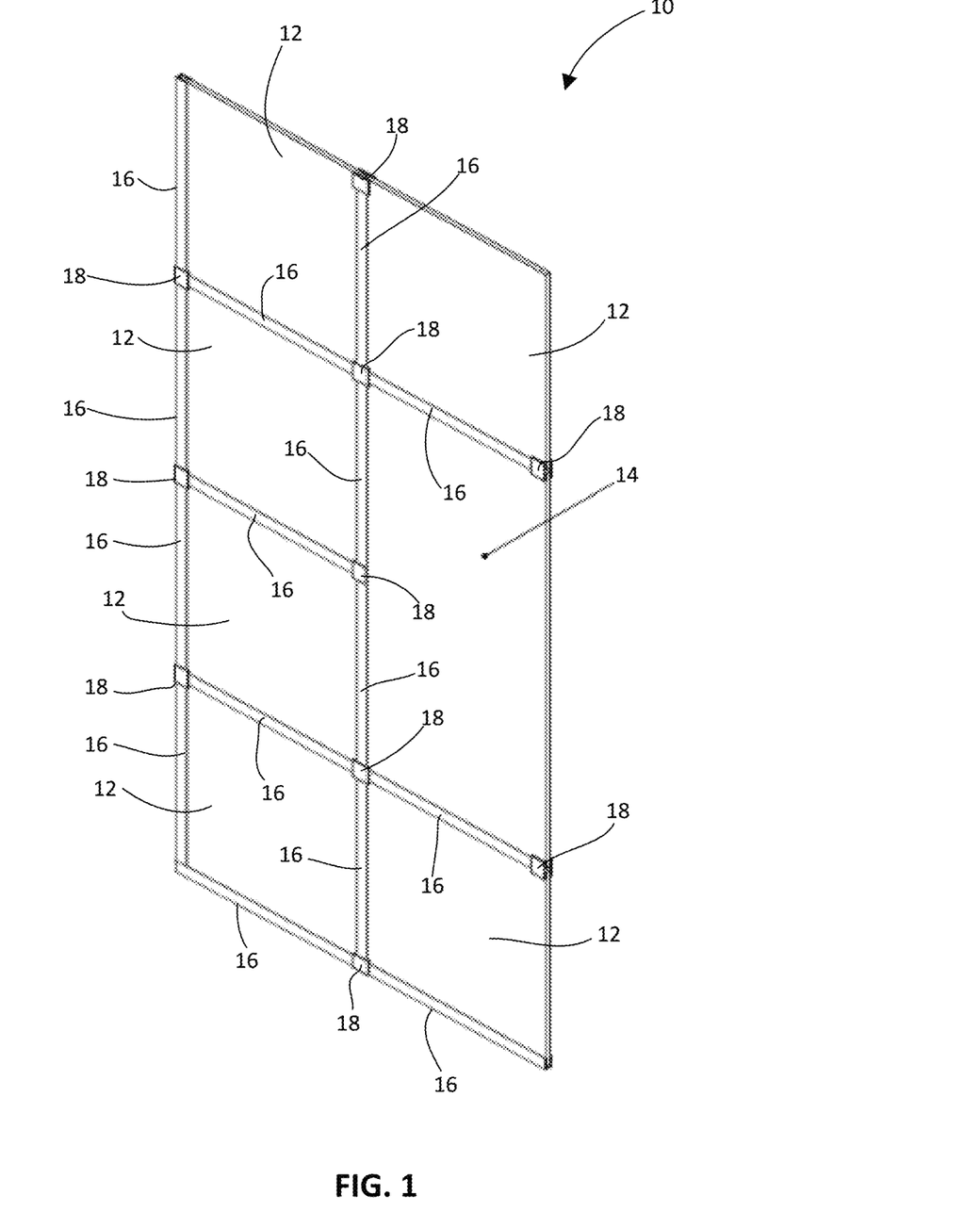
FIG. 1 is a perspective view of a modular panel assembly in accordance with an aspect of the disclosure.
Figure 2A:
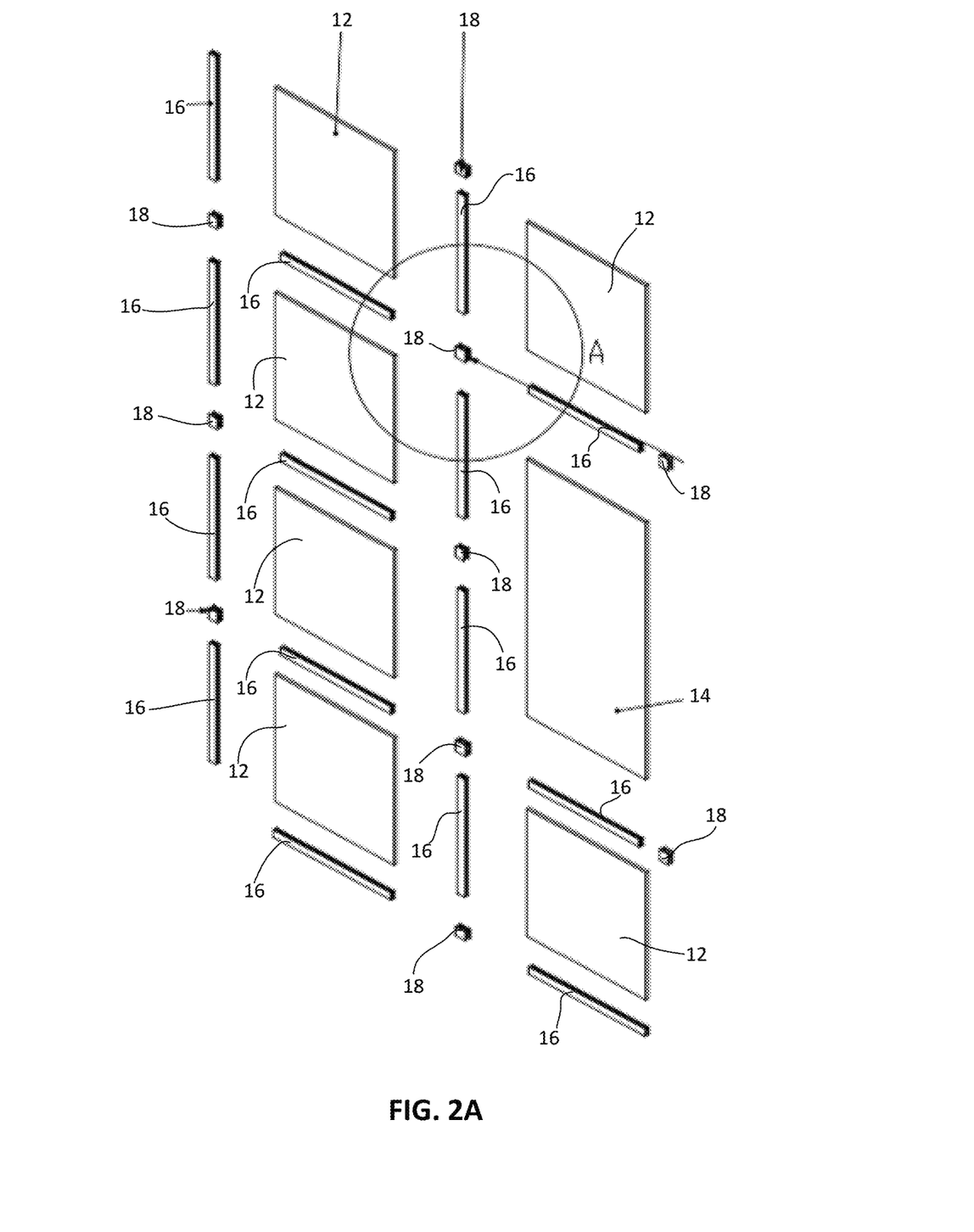
FIG. 2A is an exploded view of the modular panel assembly of FIG. 1.

Referring to FIG. 1 and FIG. 2A, a modular panel assembly 10 in accordance with an aspect of the disclosure is shown. Modular panel assembly 10 includes a plurality of separate panels 12, 14 coupled together by way of a plurality of channel members 16 and a plurality of brackets 18 to form a single modular panel for use as, e.g., a shower door. However, it is to be understood that modular panel assembly 10 is not limited to use with shower/bath enclosures, and may be used in any appropriate environment utilizing enclosures and/or panel assemblies.

In some embodiments, each of panels 12, 14 may be formed as glass panels. However, it is to be understood that one or more of panels 12, 14 may be formed of materials other than glass. For example, one or more of panels 12, 14 may be formed of a composite material, wood, plastic, etc. Additionally and/or alternatively, as will be described in further detail below, one or more of the panels 12, 14 may be support or house one or more electronic devices such as, e.g., a digital display, a touch-screen interface, an audio speaker and/or microphone, etc.

Figure 2B:
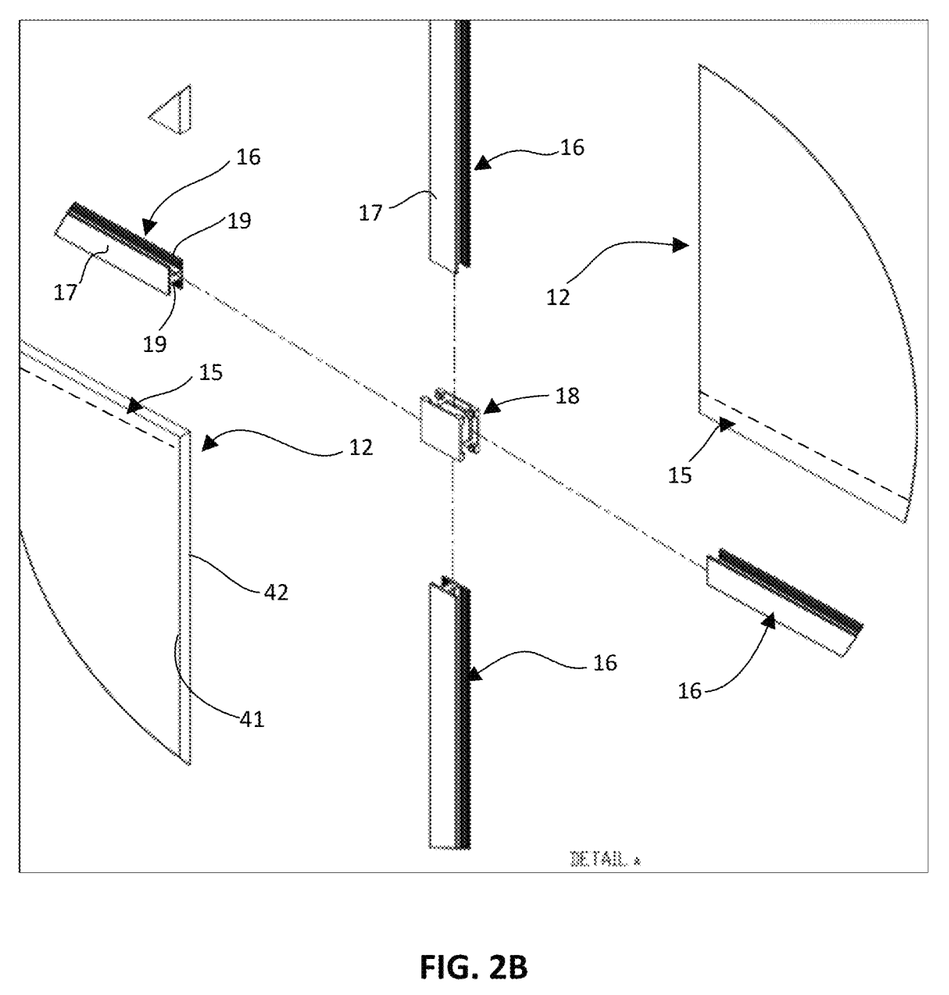
FIG. 2B is a detail exploded view of a portion of the modular panel assembly as illustrated in FIG. 2A.

As noted, modular panel 10 includes a plurality of separate panels 12, 14. FIG. 2B shows that each panel 12, 14 includes a first side surface 41 and a second side surface 42, with the second side surface 42 facing opposite the first side surface 41. As shown in FIG. 1 and FIG. 2A, the panels 12 are generally square-shaped panels, while panel 14 is a generally rectangular-shaped panel, larger in size than panels 12. While FIG. 1 and FIG. 2A illustrate a total of six square-shaped panels 12 being used and only one rectangular-shaped panel 14 being used, it is to be understood that modular panel assembly 10 is not limited to this configuration, and may incorporate more or fewer of panels 12 and/or more or fewer of rectangular panels 14. Furthermore, modular panel assembly 10 is not limited to use with only square- and/or rectangular-shaped panels. For example, one or more panels forming part of modular panel assembly 10 could be L-shaped, triangular, etc. The modular panel assembly 10 is also not limited to be being formed in a rectangular shape such as that which is shown in FIG. 1. That is, the modular panel assembly 10 can be customized to omit one or more panels 12, 14 and/or provide one or more panels 12, 14 of differing shapes and/or sizes so as to accommodate the space requirements of a specific application.

Additionally, not only may panels 12, 14 differ in shape and/or size, but they may also differ in other aesthetic characteristics, too. For example, one or more of the panels 12, 14 may be different in color, tint, texture, pattern, etc. than one or more other panels 12, 14, allowing for section(s) of modular panel 10 to be aesthetically unique as compared other section(s). For example, in one embodiment, a modular panel assembly 10 may be customized such that the uppermost two square-shaped panels 12 are formed of a clear glass, while all panels 12, 14 below those uppermost panels 12 are formed of a colored, tinted, textured, and/or patterned glass. In this way, if the modular panel assembly 10 is used as a shower door or otherwise in conjunction with a shower enclosure, a shower user may enjoy increased visibility, light transmission, etc. through the uppermost panels 12, while still being afforded privacy via the lower panels 12, 14. However, this embodiment is not to be considered limiting, and modular panel assembly 10 may be customized to utilize panels 12 and/or panels 14 of any desired shape, size, color, tint, texture, pattern, etc., and in any desired formation.

Referring still to FIG. 1 and FIG. 2A, in order to couple the plurality of separate panels 12, 14 together to form a singular modular panel assembly 10, at least one channel member 16 may be positioned between each adjacent panel 12 and/or panel 14. More specifically, referring to FIG. 2B, each channel member 16 may include a pair of opposed sidewalls 17 forming one or more channels 19, with each channel 19 sized such that an edge portion 15 of a panel 12, 14 may fit within a channel 19. In some embodiments, an adhesive may be added to the channel 19 and/or the edge portion 15 prior to placement of the channel member 16 on the panel 12, 14 so as to secure the panel 12, 14 to the channel member 16 and/or improve a water-tight connection between the panel 12, 14 to the channel member 16. Additionally and/or alternatively, the fit between the edge portion 15 of a panel 12, 14 with a channel 19 may be sufficiently tight such that an adhesive or other sealant may not be necessary to secure the channel member 16 to the panel 12, 14. The channel members 16 may be formed of any appropriate material such as, e.g., aluminum, stainless steel, plastic, etc., and may be formed having a variety of colors, finishes, textures, etc.

While FIG. 2B shows that each of the channel members 16 is formed as an H-shaped channel member (i.e., having a pair of opposing channels 19), it is to be understood that one or more channel member 16 may be formed in alternative configuration(s). For example, while any interior channel members 16 that are positioned so as to support two adjacent panels 12, 14 may be H-shaped channel members, those channel members 16 that are only positioned on a single edge of a single panel 12, 14 may be configured as, e.g., U-shaped channel members, with only one channel 19 formed in each channel member 16.

In addition to channel members 16 joining adjacent panels 12, 14, and in accordance with an aspect of the disclosure, modular panel assembly 10 further includes a plurality of brackets 18. As will be discussed in further detail below, each bracket 18 may be configured to grip both a first side surface 41 and a second side surface 42 of the panels 12, 14, as well as an end portion of channel members 16, thereby providing a secure connection between adjacent panels 12, 14. As shown in FIG. 1, brackets 18 can be utilized to join the corners of up to four separate panels 12, 14. However, brackets 18 are not limited to use at the corners of panels 12, 14, and may also be positioned at any location along an edge of panels 12, 14 to aid in joining two or more adjacent panels 12, 14 so as to form the modular panel assembly 10.

Furthermore, as discussed above, in some embodiments, an adhesive may be applied between the channel member 16 and an edge portion 15 of the panels 12, 14 in order to further secure and seal the modular panel assembly 10. By incorporating a mechanical connection provided by the brackets 18 as opposed to only a press-fit connection between the channel members 16 and the panels 12, 14, the adhesive is allowed to sufficiently cure after application, as the brackets may prevent undesirable movement of the panels 12, 14 within the channel members 16.

Figure 3:
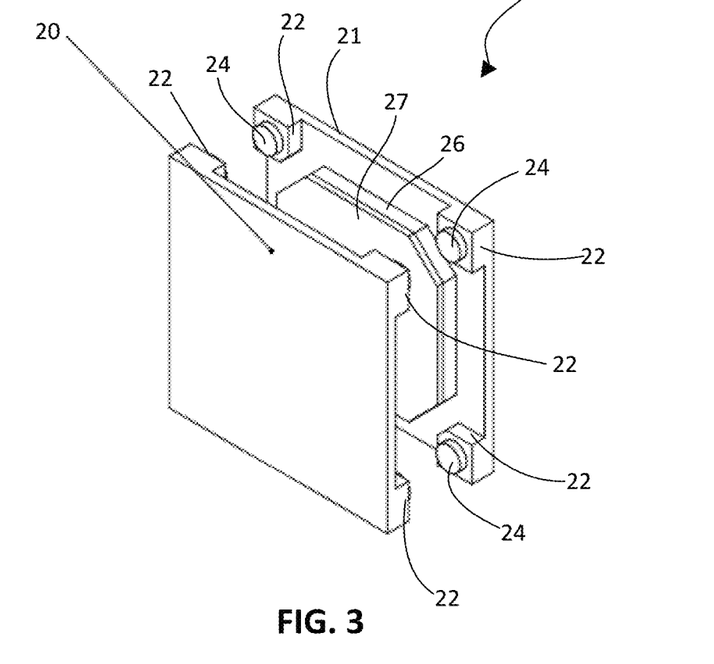
FIG. 3 is a perspective view of a connection bracket for use with a modular panel in accordance with an aspect of the disclosure.
Figure 4:
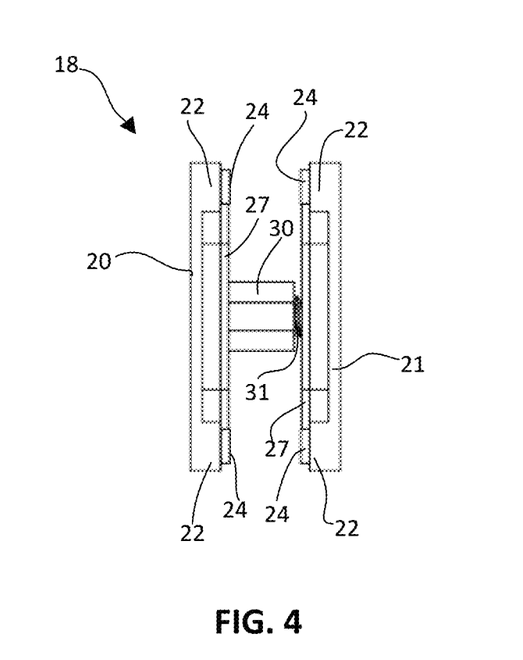
FIG. 4 is a side view of the connection bracket of FIG. 3.
Figure 5:
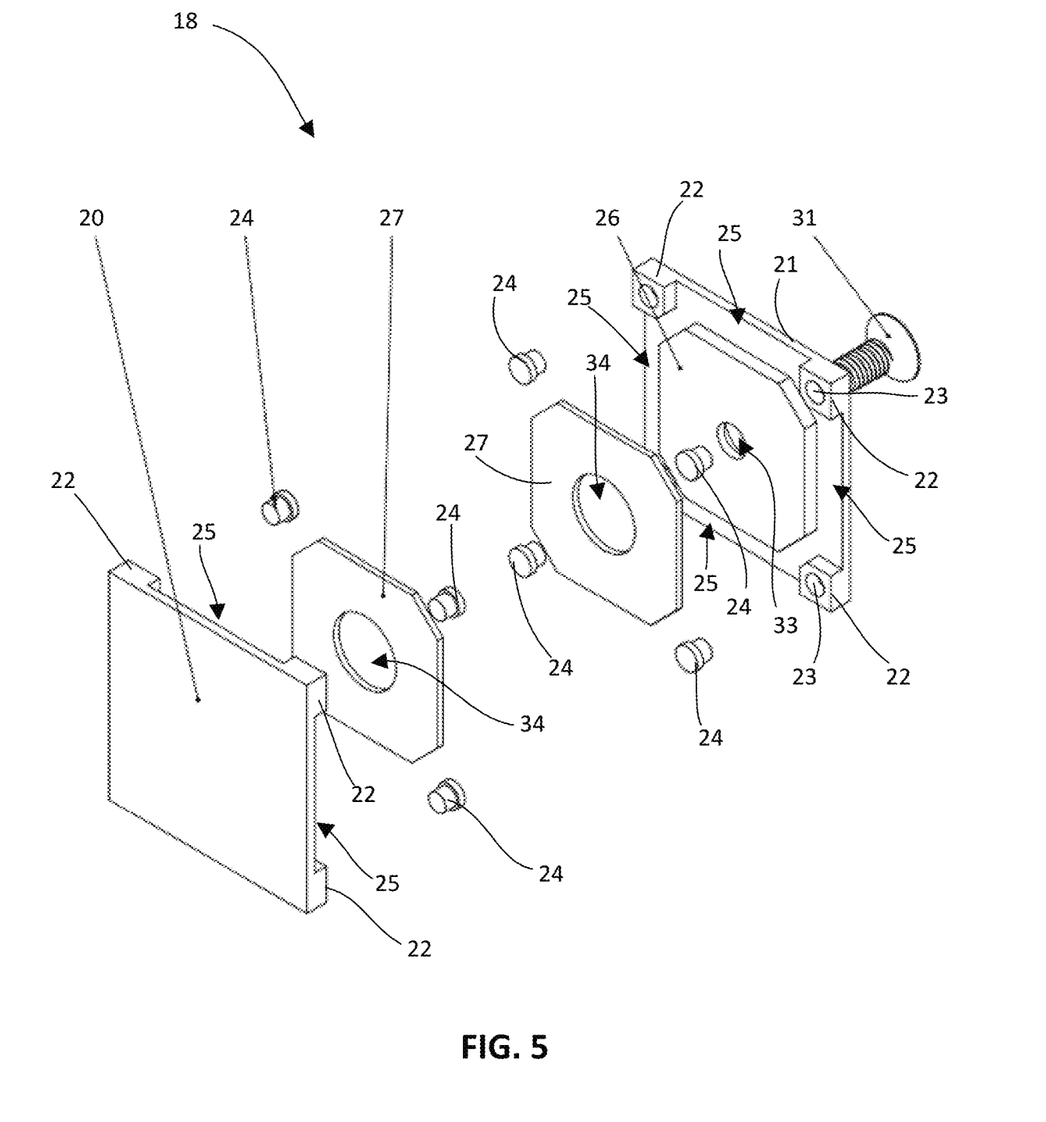
FIG. 5 is an exploded view of the connection bracket of FIG. 3.

Referring now to FIGS. 3-5, a bracket 18 in accordance with one aspect of the disclosure is described in further detail. Each bracket 18 includes a first plate 20 and a second plate 21. Each of the first plate 20 and second plate 21 may be formed of any appropriate material such as, e.g., aluminum, stainless steel, plastic, etc., and may be any desired color, finish, texture, etc. Furthermore, first plate 20 and second plate 21 may be formed of the same material or different materials. As shown in FIG. 4, first plate 20 includes a threaded post 30 extending from an inner surface thereof. The threaded post 30 is configured to receive a screw 31 provided through a hole 33 (shown in FIG. 5) formed in second plate 21. In this way, as screw 31 is tightened within threaded post 30, the respective inner surfaces of first plate 20 and second plate 21 are drawn toward one another, enabling the bracket 18 to provide a clamping force on both the first side surface 41 and the second side surface 42 on multiple panels 12, 14 when coupled between respective panels 12, 14, as described above.

In some embodiments, for aesthetic purposes, first plate 20 may be configured as the "front plate", facing outward from the shower/bath enclosure such that there is no visible screw or through-hole when viewing the modular panel assembly 10 from outside of a shower/bath enclosure. However, it is to be understood that the function of bracket 18 does not rely on the position of the first plate 20 and/or second plate 21 with respect to the shower/bath enclosure, and that in other embodiments, second plate 21 may face outward from the shower/bath enclosure. Furthermore, in an alternative embodiment, the second plate 21 may incorporate an inwardly-directed threaded screw member fixedly formed or secured on an inner surface thereof. In this way, the need for a separate screw 31 and hole 33 to secure second plate 21 is obviated, allowing a visible external surface of second plate 21 to be continuous and flush, similar to the visible external surface of first plate 20.

Referring still to FIGS. 3-5, both the first plate 20 and the second plate 21 include an inward-facing raised step 22 located at each corner of the respective plates 20, 21, along with an inward-facing raised platform 26 located at a central portion of each of the respective plates 20, 21. In some embodiments, each of the raised steps 22 and raised platforms 26 are integrally formed with the respective first plate 20 and second plate 21 during manufacture via, e.g., stamping, machining, molding, etc. Alternatively, in other embodiments, one or both of the raises steps 22 and raised platforms 26 may be formed separately from the first plate 20 and second plate 21 and incorporated by way of, e.g., an adhesive connection.

Each raised step 22 may further include a well 23, wherein each well 23 is sized and configured so as to receive a plug 24 therein. In some embodiments, each plug 24 is formed of a soft, non-slip material such as, e.g., rubber, and may be held within a respective well 23 by way of any appropriate connection (i.e., press-fit, adhesive, etc.). Furthermore, a gasket member 27 may be disposed atop each raised step 26. Each gasket member 27 may also be formed of a soft material such as, e.g., vinyl, rubber, etc. The gasket members 27 may be coupled to a respective raised step 26 by any appropriate method such as, e.g., an adhesive. As shown in FIG. 5, each gasket member 27 may include a hole 34 formed therein, wherein each hole 34 allows the threaded post 30 and/or screw 31 to be accessible for coupling of the first plate 20 and the second plate 21.

As is best illustrated in FIG. 4, when applied/attached to the respective first plate 20 and second plate 21, each plug 24 and gasket member 27 extends inward a substantially equal amount from an inner surface of a respective first plate 20 and second plate 21. Accordingly, as the bracket 18 is positioned on the corners and/or edges of adjacent panels, and screw 31 is tightened so as to draw the first plate 20 and second plate 21 closer together, the corners and/or edges of the panels are clamped by the first plate 20 and second plate 21, with only the soft, high-grip materials of the plugs 24 and gasket members 27 making contact with the surfaces of the panels. As such, there is little to no contact between the hard surfaces of the first plate 20 and the second plate 21 and the panels, increasing the grip of the bracket 18 on the panels and reducing the risk of damage to the panels as the brackets 18 are tightened. Furthermore, the gasket members 27 may act to prevent water from leaking from/through the brackets 18 when coupled to the respective panels.

In addition to each bracket 18 being configured to securely clamp two or more panels together, brackets 18 are also configured to securely clamp an end portion of one or more channel members 16. Specifically, as is shown in FIG. 5, a gap 25 is formed between each neighboring or successive raised step 22 on both the first plate 20 and the second plate 21. The width of each gap 25 is consistent with the width of the sidewalls 17 of channel members 16 (shown in FIG. 2B), thereby allowing an end portion of each channel member 16 to fit within a gap 25 during production of a modular panel assembly 10. As the respective first plate 20 and second plate 21 are moved closer together when the screw 31 is turned to clamp the panel(s) together, the end portions of each channel member 16 are similarly clamped within the respective gaps 25 such that the channel members 16 are also secured by the brackets 18.

While not explicitly shown in FIGS. 1-5, it is to be understood that brackets 18 clamp only the corners and/or edges of panels 12, 14, and that neither the threaded post 30 nor the screw 31 pass through any portion of the panels 12, 14. In this way, no through-holes need to be drilled or otherwise formed in each panel 12, 14 in order to accommodate the brackets 18, greatly simplifying the formation of each panel 12, 14 and allowing for greater customization of the placement of brackets 18 within the modular panel assembly 10. Furthermore, while FIGS. 4-5 illustrate the threaded post 30 and screw 31 being disposed centrally along the respective first plate 20 and second plate 21, in some embodiments, a bracket 18 may be configured such that the threaded post 30 and screw 31 are offset from the central axis of the first plate 20 and second plate 21, thereby also offsetting the hole 33 formed in second plate 21 and the holes 34 formed within each gasket member 27. Such an offset placement of the threaded post 30 and hole 33 may be beneficial when a bracket 18 is utilized on an edge connection of only two adjacent panels, as opposed to an interior connection of more than two adjacent panels.

Additionally, while the brackets 18 illustrated in FIGS. 1-5 are shown as having four sides of equal length, in alternative embodiments, it is to be understood that brackets 18 may be formed having more or fewer than four sides and/or sides of unequal length.

Furthermore, in accordance with other aspects of the disclosure, the brackets utilized to securely clamp adjacent panels and/or channel members are not limited to the configuration of brackets 18 as described above. For example, in some embodiments, the brackets may clamp magnetically, through a snap-fit interface, through a slide-fit interface, or through any other appropriate coupling means.

Figure 6:
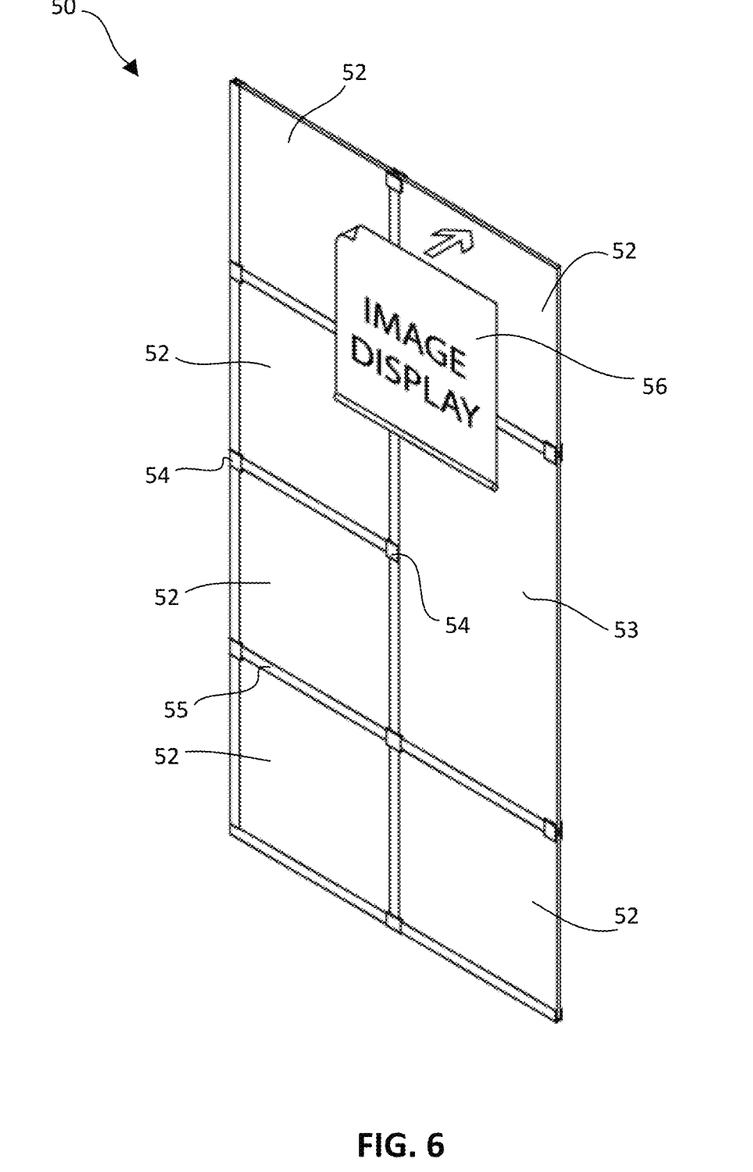
FIG. 6 is a perspective view of a modular panel assembly having an image display in accordance with another aspect of the disclosure.

Next, referring to FIG. 6, a modular panel assembly 50 in accordance with another aspect of the disclosure is shown. Similar to modular panel assembly 10 described above with respect to FIG. 1, modular panel assembly 50 includes a plurality of separate panels 52, 53 coupled together by way of a plurality of channel members 55 and a plurality of brackets 54 to form a single modular panel for use as, e.g., a shower door. However, it is to be understood that modular panel assembly 50 is not limited to use with shower/bath enclosures, and may be used in any appropriate environment utilizing enclosures and/or panels assemblies.

As shown in FIG. 6, the panels 52 may be generally square-shaped panels, while panel 53 may be a generally rectangular-shaped panel, larger in size than panels 52. While FIG. 6 illustrates a total of six square-shaped panels 52 being used and only one rectangular-shaped panel 53, it is to be understood that modular panel assembly 50 is not limited to this configuration, and may incorporate more or fewer of panels 52 and/or more or fewer of rectangular panels 53. Furthermore, modular panel assembly 50 is not limited to use with only square- and/or rectangular-shaped panels.

Additionally, modular panel assembly 50 includes a digital screen 56, which is sized and configured to be attached to a surface of one of the panels 52, 53. Specifically, digital screen 56 is configured as a thin, flexible screen capable of visually displaying digital images and/or other information. In some embodiments, the digital screen 56 may be attached to a panel 52, 53 via, e.g., an adhesive. Also, in some embodiments, digital screen 56 may be powered by one or more batteries. However, it is to be understood that digital screen 56 may be affixed to a panel 52, 53 via any appropriate attachment means, and digital screen 56 may be powered also be powered by any appropriate means such as, e.g., a hardwired electrical connection, photovoltaic cells, etc.

Furthermore, while only one digital screen 56 is illustrated in FIG. 6, it is to be understood that more than one digital screen 56 may be attached to panels 52, 53, and that the size and/or shape of the digital screen(s) 56 may vary based on the corresponding size and/or shape of respective panels 52, 53. In some embodiments, the digital screen(s) 56 may include an on-board processor and computer-readable memory to display information and/or images on the digital screen(s) 56. Additionally and/or alternatively, the digital screen(s) 56 may be capable of wired and/or wireless communication with one or more external devices such that remotely-accessed information and/or images may be received and displayed by digital screen(s) 56.

Figure 7:
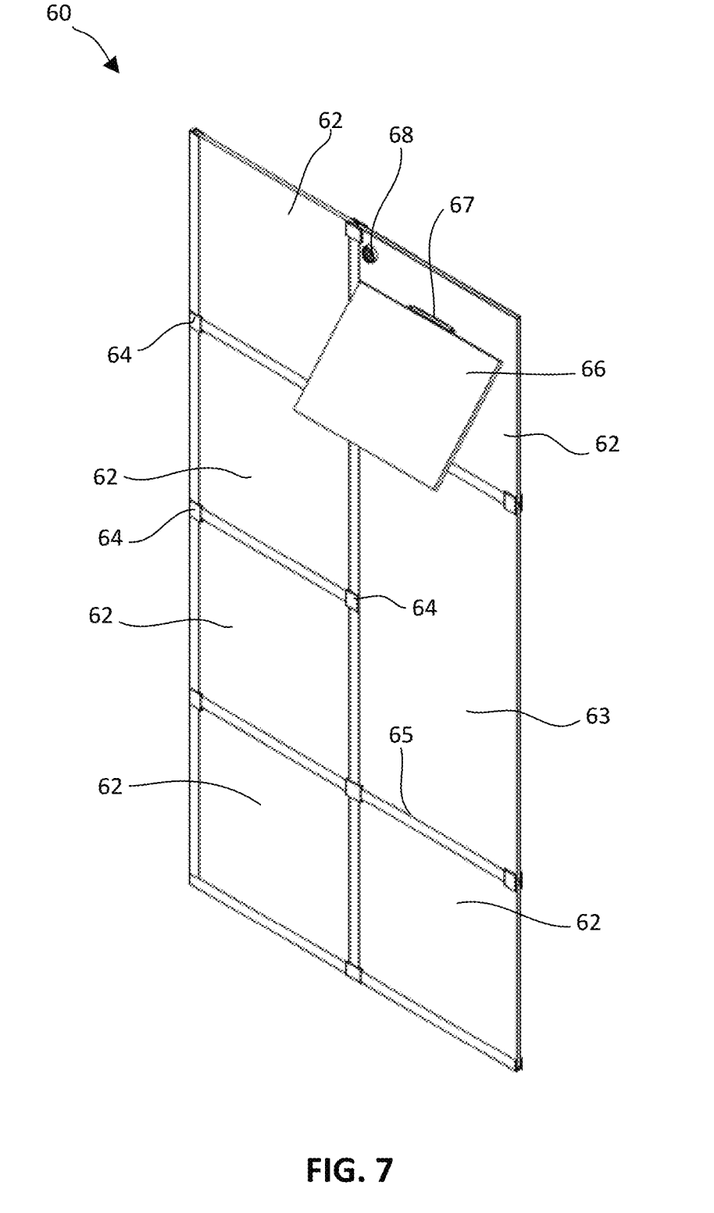
FIG. 7 is a perspective view of a modular panel assembly having a voice recording and digital writing interface in accordance with another aspect of the disclosure.

Next, referring to FIG. 7, a modular panel assembly 60 in accordance with another aspect of the disclosure is shown. Similar to modular panel assembly 50 described above with respect to FIG. 6, modular panel assembly 60 includes a plurality of separate panels 62, 63 coupled together by way of a plurality of channel members 65 and a plurality of brackets 64 to form a single modular panel for use as, e.g., a shower door. However, it is to be understood that modular panel assembly 60 is not limited to use with shower/bath enclosures, and may be used in any appropriate environment utilizing enclosures and/or panels assemblies.

As shown in FIG. 7, the panels 62 may be generally square-shaped panels, while panel 63 may be a generally rectangular-shaped panel, larger in size than panels 62. While FIG. 7 illustrates a total of six square-shaped panels 62 being used and only one rectangular-shaped panel 63 being used, it is to be understood that modular panel assembly 60 is not limited to this configuration, and may incorporate more or fewer of panels 62 and/or more or fewer of rectangular panels 63. Furthermore, modular panel assembly 60 is not limited to use with only square- and/or rectangular-shaped panels.

While modular panel assembly 50 shown and described with respect to FIG. 6 included a digital screen 56, modular panel assembly 60 shown in FIG. 7 may include a digital writing interface 66, capable of digitally recording handwritten notes, instructions, etc. written on the surface of the interface 66. The interface 66 may be coupled to one or more panels 62, 63 though a hinge member 67, thereby allowing the angle of interface 66 to be adjusted based on user preference. Additionally and/or alternatively, modular panel assembly 60 may include a voice recording device 68 capable of receiving and recording vocal notes, instructions, etc. via a microphone. In some embodiments, voice recording device 68 may include a speaker capable of playing back, e.g., recorded notes, music, etc.

In some embodiments, digital writing interface 66 and/or voice recording device 68 may be powered by one or more batteries. However, it is to be understood that digital writing interface 66 and/or voice recording device 68 may be powered also be powered by any appropriate means such as, e.g., a hardwired electrical connection, photovoltaic cells, etc.

Furthermore, while only one digital writing interface 66 and only one voice recording device 68 is illustrated in FIG. 7, it is to be understood that more than one digital writing interface 66 and/or more than one voice recording device 68 may be attached to panels 62, 63, and that the size and/or shape of the digital writing interface 66 may vary based on the corresponding size and/or shape of respective panels 62, 63. In some embodiments, the digital writing interface 66 and/or the voice recording device 68 may include an on-board processor and computer-readable memory capable of recording and storing information from the digital writing interface 66 and/or the voice recording device 68. Additionally and/or alternatively, the digital writing interface 66 and/or the voice recording device 68 may be capable of wired and/or wireless communication with one or more external devices such that recorded information may be sent from and/or received by the digital writing interface 66 and/or the voice recording device 68.

Figure 8:
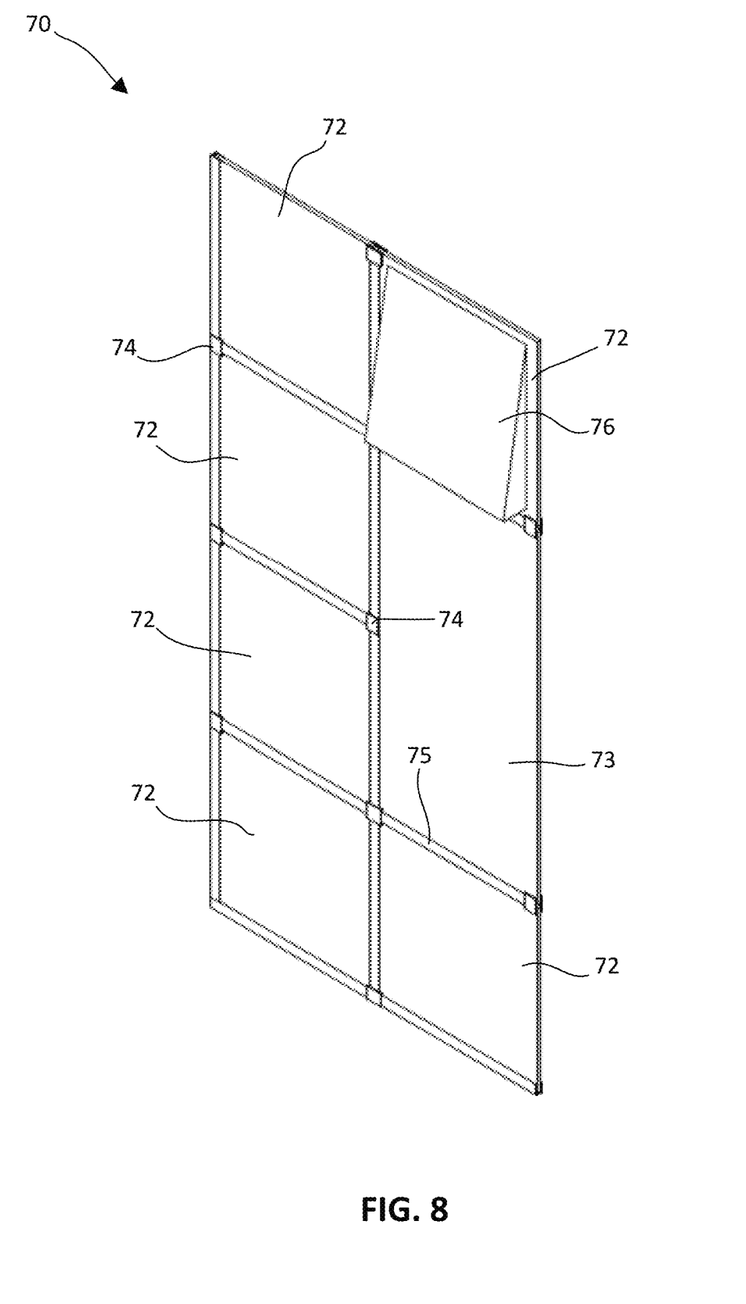
FIG. 8 is a perspective view of a modular panel assembly having a digital display and touch interface in accordance with another aspect of the disclosure.

Next, referring to FIG. 8, a modular panel assembly 70 in accordance with another aspect of the disclosure is shown. Similar to modular panel assembly 50 and modular panel assembly 60 described above with respect to FIG. 6 and FIG. 7, respectively, modular panel assembly 70 includes a plurality of separate panels 72, 73 coupled together by way of a plurality of channel members 75 and a plurality of brackets 74 to form a single modular panel for use as, e.g., a shower door. However, it is to be understood that modular panel assembly 70 is not limited to use with shower/bath enclosures, and may be used in any appropriate environment utilizing enclosures and/or panels assemblies.

Modular panel assembly 70 further includes a digital display and touch interface 76 capable of displaying information and/or images and receiving user inputs. The digital display and touch interface 76 may be affixed or otherwise coupled to one or more panels 72, 73 through any appropriate attachment means, such as an adhesive, one or more mechanical connectors, etc. In some embodiments, digital display and touch interface 76 may be powered by one or more batteries. However, it is to be understood that digital display and touch interface 76 may be powered also be powered by any appropriate means such as, e.g., a hardwired electrical connection, photovoltaic cells, etc.

While only one digital display and touch interface 76 is illustrated in FIG. 8, it is to be understood that more than one digital display and touch interface 76 may be attached to panels 72, 73, and that the size and/or shape of the digital display and touch interface 76 may vary based on the corresponding size and/or shape of respective panels 72, 73. In some embodiments, the digital display and touch interface 76 may include an on-board processor and computer-readable memory. Additionally and/or alternatively, the digital display and touch interface 76 may be capable of wired and/or wireless communication with one or more external devices.

Figure 9:
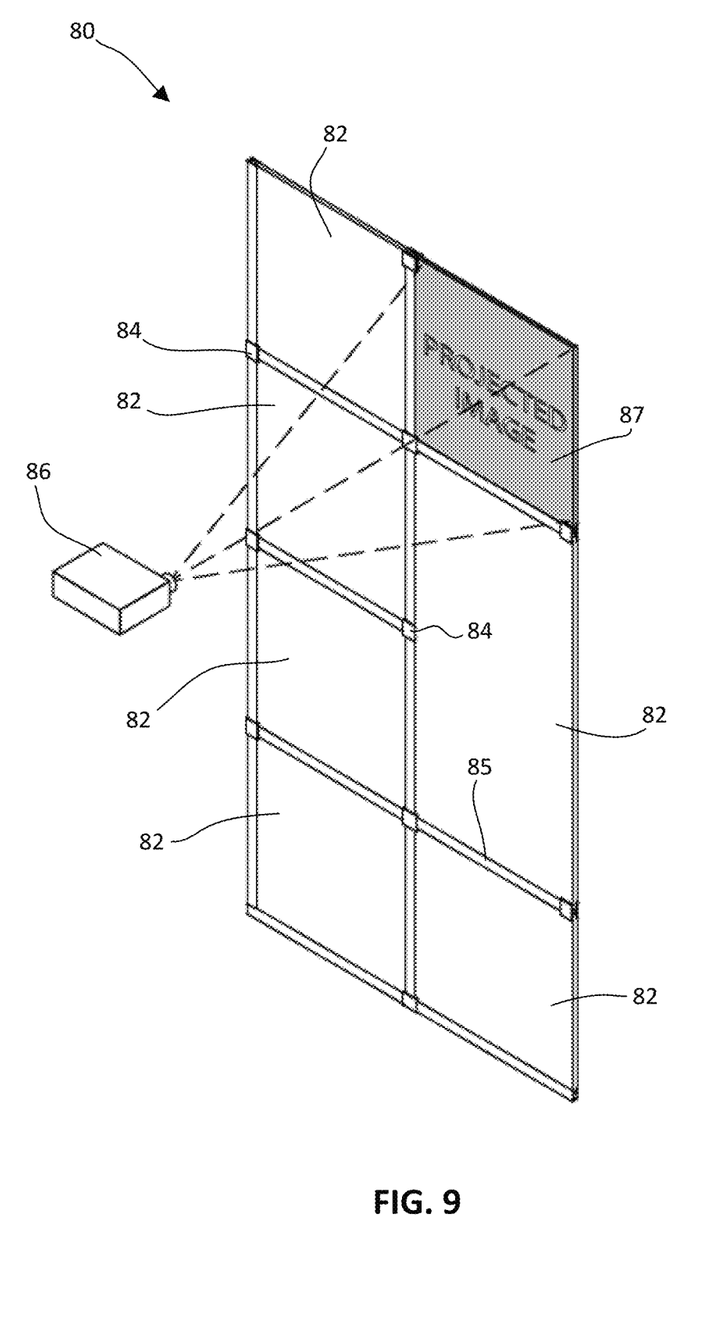
FIG. 9 is a perspective view of a modular panel assembly having a panel for displaying a projected image in accordance with another aspect of the disclosure.

Referring to FIG. 9, a modular panel assembly 80 in accordance with another aspect of the disclosure is shown. While FIGS. 6-8 illustrate modular panel assemblies having digital displays and/or other interfaces coupled to one or more of the panels, modular panel assembly 80 is configured such that one or more of the panels receives a projected image from an external projector device.

Specifically, modular panel assembly 80 includes a plurality of separate panels 82, 83 coupled together by way of a plurality of channel members 85 and a plurality of brackets 84 to form a single modular panel for use as, e.g., a shower door. At least one of the panels 82, 83 is configured to receive a projected image 87, which is emitted from an externally-mounted projector device 86. In some embodiments, the panel(s) 82, 83 upon which projected image 87 is displayed may be textured or otherwise optimized for receipt of the projected image 87. However, panels 82, 83 need not be altered or customized to receive the projected image 87. While only projected image 87 and/or only one projector 86 is illustrated in FIG. 9, it is to be understood that more than one projected image and/or more than one projector may be utilized, and that the size and/or shape of the projected image may vary based on the corresponding size and/or shape of respective panels 82, 83.

Figure 10:
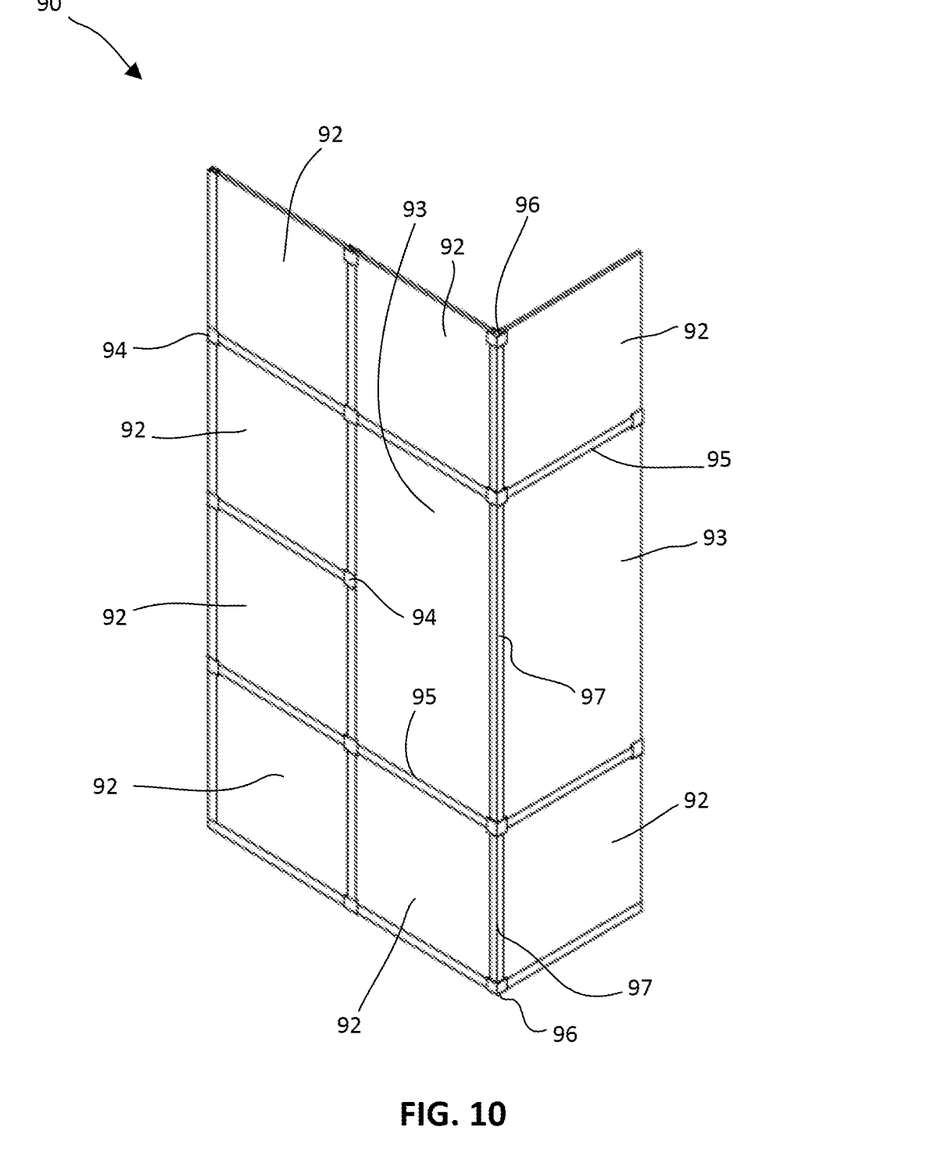
FIG. 10 is a perspective view of a modular panel assembly having a 90 degree enclosure configuration in accordance with another aspect of the disclosure.

Next, referring to FIG. 10, a modular panel assembly 90 in accordance with another aspect of the disclosure is shown. Unlike the modular panel assemblies shown and described with respect to FIG. 1 and FIGS. 6-9, which each provided for a planar modular panel assembly, modular panel assembly 90 is configured to allow for a 90° enclosure configuration. Modular panel assembly 90 includes a plurality of separate panels 92, 93 coupled together by way of a plurality of channel members and a plurality of brackets to form a modular panel for use as, e.g., a shower enclosure. However, while the channel members 95 and brackets 94 may be configured similarly to those described above with respect to FIG. 1 and FIGS. 6-9, modular panel assembly 90 may further include a plurality of channel members 97 and brackets 96 configured to couple adjacent panels 92, 93 at a 90° angle relative to one another, thereby providing for a more complete enclosure, as opposed to only a planar door, panel, etc.

Figure 11:
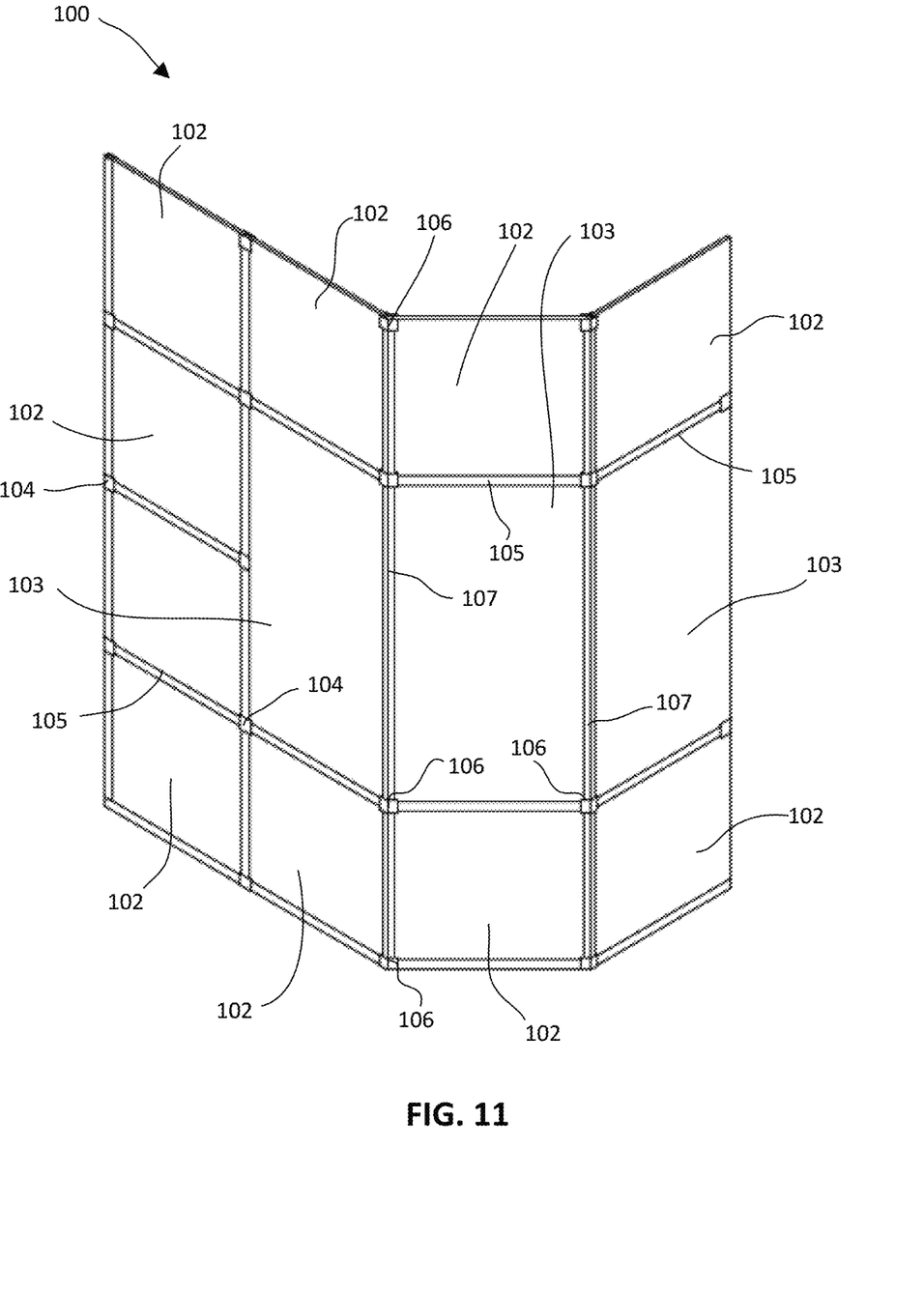
FIG. 11 is a perspective view of a modular panel assembly having a 135 degree enclosure configuration in accordance with another aspect of the disclosure.

Similarly, referring to FIG. 11, a modular panel assembly 100 in accordance with another aspect of the disclosure is shown. Like modular panel assembly 90 shown and described with respect to FIG. 10, modular panel assembly 100 provides for a more complete enclosure, while still retaining the benefits of utilizing multi-configurable panels. Specifically, modular panel assembly 100 includes a plurality of separate panels 102, 103, with some of the panels 102, 103 coupled together via a plurality of channel members 105 and brackets 104 so as to form planar sections of an modular panel assembly. However, modular panel assembly 100 may further include a plurality of channel members 107 and brackets 106 configured to couple adjacent panels 102, 103 at a 135° angle relative to one another. While FIGS. 10-11 illustrate modular panel assemblies having 90° and 135° enclosure configurations, respectively, it is to be understood that the modular panel assemblies in accordance with the disclosure are not limited as such, and may have any appropriate angular enclosure configuration.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A modular panel assembly comprising:
   a plurality of panels, each panel having a first side surface and a second side surface, wherein the second side surface is opposite the first side surface;
   a plurality of channel members, wherein each channel member is configured to be coupled to an edge portion of one or more panels; and
   a plurality of brackets, wherein each of the plurality of bracket is configured to hold both the first side surface and the second side surface of two or more of the plurality of panels and an end portion of one or more of the plurality of channel members, and each of the plurality of brackets comprises a first plate and a second plate, wherein:
   an inner surface of the first plate is configured to be aligned with an inner surface of the second plate;
   each of the first plate and the second plate comprise:
      four sides of equal length,
      a raised step extending from the inner surface at each corner between adjacent sides, and a raised platform extending from the inner surface at a central portion of the respective first plate and second plate;
   the first plate further comprises a threaded post extending from the inner surface;
   the second plate further comprises a hole formed opposite the threaded post, and the hole is sized and configured to allow through passage of a screw for insertion into the threaded post.

2. The modular panel assembly of claim 1, wherein at least one of the plurality of panels is of a different size than at least one other of the plurality of the panels.

3. The modular panel assembly of claim 1, wherein at least one of the plurality of panels is of a different shape than at least one other of the plurality of panels.

4. The modular panel assembly of claim 1, wherein at least one of the plurality of panels is a glass panel.

5. The modular panel assembly of claim 1, wherein at least one of the plurality of panels is one or more of a different material, color, tint, texture, or pattern than at least one other of the plurality of panels.

6. The modular panel assembly of claim 1, further comprising at least one of a digital display, a digital touch interface, a digital writing interface, a voice recording device, or a panel configured to display a projected image.

7. The modular panel assembly of claim 6, wherein at least one of the digital display, the digital touch interface, the digital writing interface, or the voice recording device is coupled to at least one of the plurality of panels.

8. The modular panel assembly of claim 6, wherein at least one of the digital display, the digital touch interface, the digital writing interface, or the voice recording device is powered by one or more batteries.

9. The modular panel assembly of claim 1, further comprising a plurality of angled brackets and a plurality of angled channel members, wherein the plurality of angled brackets and the plurality of angled channel members enable the modular panel assembly to form an enclosure.

10. The modular panel assembly of claim 9, wherein the plurality of angled brackets and the plurality of angled channel members are configured to couple adjacent panels at one of a 90° angle or a 135° angle.

11. The modular panel assembly of claim 1, wherein each of the plurality of brackets further comprises:
a plug coupled to each of the raised steps; and
a gasket member coupled to each of the raised platforms.

12. A modular panel assembly for an enclosure, the modular panel assembly comprising:
a plurality of panels;
a plurality of channel members;
a plurality of brackets, wherein at least some of the brackets are configured to:
couple two or more of the panels, and
receive and hold an end portion of one or more of the plurality of channel members, and each of the plurality of brackets comprises a first plate and a second plate, wherein:
an inner surface of the first plate is configured to be aligned with an inner surface of the second plate;
each of the first plate and the second plate comprise:
four sides of equal length,
a raised step extending from the inner surface at each corner between adjacent sides, and a raised platform extending from the inner surface at a central portion of the respective first plate and second plate;
the first plate further comprises a threaded post extending from the inner surface;
the second plate further comprises a hole formed opposite the threaded post, and the hole is sized and configured to allow through passage of a screw for insertion into the threaded post; and
at least one of a digital display, a digital touch interface, a digital writing interface, a voice recording device, or a panel configured to display a projected image.

13. The modular panel assembly of claim 12, wherein at least one of the digital display, the digital touch interface, the digital writing interface, or the voice recording device is coupled to at least one of the plurality of panels.

14. The modular panel assembly of claim 12, wherein at least one of the digital display, the digital touch interface, the digital writing interface, or the voice recording device is powered by one or more batteries.

15. The modular panel assembly of claim 12, wherein at least one of the plurality of panels is at least one of a different size, a different shape, or a different material than at least one other of the plurality of the panels.

16. A method of forming a modular panel assembly, the method comprising:
providing a plurality of panels, wherein each panel has a first side surface and a second side surface;
providing a plurality of channel members having at least one channel formed therein;
coupling a channel member to at least one edge portion of each of the panels;
arranging the plurality of panels into a desired pattern of adjacent panels;
providing a plurality of brackets, and each of the plurality of brackets comprises a first plate and a second plate, wherein:
an inner surface of the first plate is configured to be aligned with an inner surface of the second plate;
each of the first plate and the second plate comprise:
four sides of equal length,
a raised step extending from the inner surface at each corner between adjacent sides, and a raised platform extending from the inner surface at a central portion of the respective first plate and second plate;
the first plate further comprises a threaded post extending from the inner surface;
the second plate further comprises a hole formed opposite the threaded post, and the hole is sized and configured to allow through passage of a screw for insertion into the threaded post; and
clamping a bracket to the first side surface and the second side surface of two or more adjacent panels and to an end portion of one or more channel members.

17. The method of forming a modular panel assembly of claim 16, wherein at least one of the plurality of panels is provided in a different size than at least one other of the plurality of panels.

18. The method of forming a modular panel assembly of claim 16, wherein at least one of the plurality of panels is provided in one or more of a different material, color, tint, texture, or pattern than at least one other of the plurality of panels.

19. The modular panel assembly of claim 1, wherein the plurality of panels, the plurality of channel members and the plurality of brackets together form a shower door.

20. The modular panel assembly of claim 12, wherein the plurality of panels, the plurality of channel members and the plurality of brackets together form a shower door.

21. The method of claim 16, wherein the modular panel assembly comprises a shower door.

* * * * *

UNITED STATES PATENT AND TRADEMARK OFFICE
CERTIFICATE OF CORRECTION

| | |
|---|---|
| PATENT NO. | : 11,242,682 B2 |
| APPLICATION NO. | : 16/665196 |
| DATED | : February 8, 2022 |
| INVENTOR(S) | : Van Kirk et al. |

It is certified that error appears in the above-identified patent and that said Letters Patent is hereby corrected as shown below:

In the Claims

In Claim 1, at Column 10, in Line 32, replace, "bracket" with "brackets".

Signed and Sealed this
Third Day of May, 2022

Katherine Kelly Vidal
*Director of the United States Patent and Trademark Office*